United States Patent [19]

Seres

[11] Patent Number: 4,644,678

[45] Date of Patent: Feb. 24, 1987

[54] PULLEY FOR DOWNRIGGER WEIGHTED LINE

[75] Inventor: Alex Seres, Frankfort, Mich.

[73] Assignee: Incoe Corporation, Troy, Mich.

[21] Appl. No.: 788,020

[22] Filed: Oct. 16, 1985

[51] Int. Cl.⁴ .............................................. A01K 97/00
[52] U.S. Cl. ......................................... 43/4; 43/27.4; 43/43.12
[58] Field of Search ..................... 43/4, 4.5, 27.4, 43.1, 43/43.12, 43.13, 44.81, 44.91, 44.92; 242/106; 254/390, 411, 415

[56] References Cited

U.S. PATENT DOCUMENTS

| | | | |
|---|---|---|---|
| 304,103 | 8/1884 | Herreshoff | 254/411 |
| 516,268 | 3/1894 | Hartz | 254/411 |
| 961,510 | 6/1910 | Mack | 254/411 |
| 1,975,940 | 10/1934 | Harding | 254/411 |
| 2,343,054 | 2/1944 | Gwinn et al. | 254/415 |
| 2,363,353 | 11/1944 | Parker | 43/24 |
| 4,128,960 | 12/1978 | Marek | 43/43.13 |
| 4,248,002 | 2/1981 | McNellis | 43/27.4 |

Primary Examiner—M. Jordan
Attorney, Agent, or Firm—Harness, Dickey & Pierce

[57] ABSTRACT

A downrigger fishing apparatus having a weighted line pulley in which the upper portion only of the pulley wheel is enclosed by and runs freely in a housing. The housing has an inlet and an outlet for the line and portions that are uniquely formed and related to the pulley wheel in a manner that prevents the line from jamming but at the same time provides sufficient clearance to permit both the pulley wheel and the line to run freely in use.

11 Claims, 5 Drawing Figures

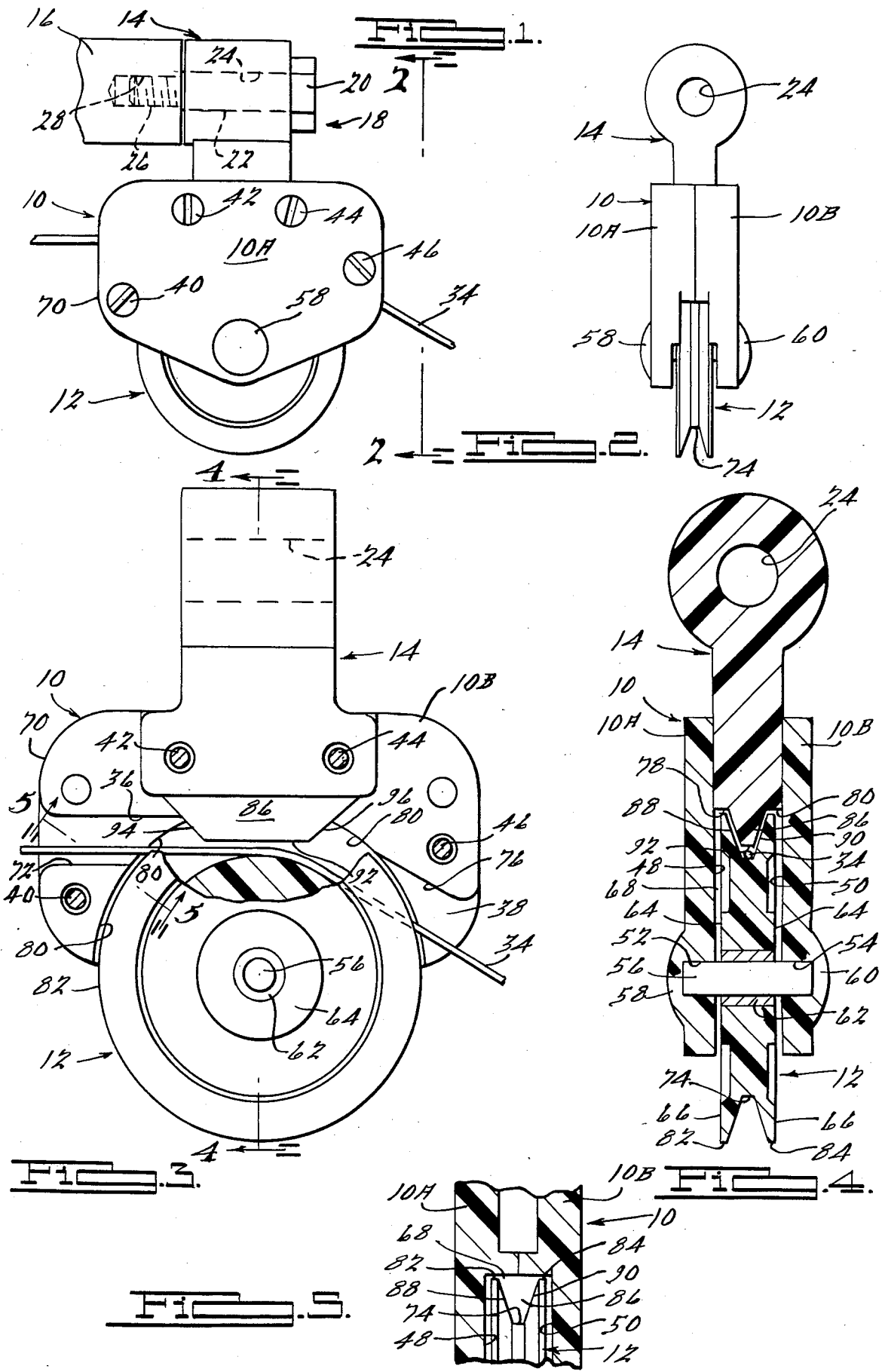

PULLEY FOR DOWNRIGGER WEIGHTED LINE

BACKGROUND OF THE INVENTION

Downrigger fishing apparatuses conventionally employ both a weighted line and a fishing line that are wound on separate reels. The weighted line runs over a guide pulley on the stern of the boat and is provided at the free end thereof with a relatively heavy weight that typically weighs 10 or 20 pounds and sometimes is referred to as a "cannonball". The weight carries the line downwardly in the water at a relatively steep angle. The fishing line is detachably fastened to the weighted line; and the terminal portion thereof trails behind the latter a short distance above the weight on the end of the weighted line. When a fish strikes a lure on the trailing end of the fishing line, it disengages the latter from the weighted line so that the fisherman can play the fish in the conventional manner. In practice, the weighted line is reeled in quickly after the strike to prevent the two lines from tangling.

Both the weighted line and the fishing line usually are trailed at relatively slow trolling speeds that permit the weight to keep the lure at the desired depth which frequently is relatively deep. Thus if the bottom is not flat, it is not unusual for the deeply submerged weight and lure to ride over high areas of bottom that may be rocky or weed covered. In these situations, the weight, being some distance below the lure, touches bottom first and bounces along or is dragged through weeds. Both of these conditions cause the weight at the end of the line to bump and bounce along, and as it jerks free of entanglements the rebound action sometimes causes the weighted line to wedge or tangle in the guide pulley.

Conventional guide pulley assemblies available on the market are constructed in such a way that it is difficult to clear the weighted line if the jerking, rebound action causes it to flip out of the pulley groove and to jam tightly between the pulley wheel and the pulley housing or to snarl and tangle in the groove of the pulley wheel. Occasionally, the line becomes so tightly jammed or tangled that it is necessary to disassemble the pulley assembly in order to free the line and if the boat is in rough water at the time, it may even be necessary to run the boat back to the dock where the water is relatively quiet. Manifestly, considerable time may be involved in doing this and this time is wasted insofar as the fisherman is concerned.

SUMMARY OF THE INVENTION

The present invention circumvents the problems described above in connection with downrigger pulley assemblies currently on the market in part at least by forming the housing in which the pulley wheel is mounted so that it encloses only an upper portion of the pulley wheel. This arrangement effectively limits the area between the pulley wheel and the housing into which the weighted line can enter and become jammed.

As a further feature of the invention the housing is formed with internal shoulders that overlay the peripheral surfaces of the pulley wheel at opposite sides of the pulley groove. The spacing between the shoulders and the confronting wheel surfaces is sufficiently small to prevent the weighted line from entering and jamming therebetween but sufficiently great to permit the pulley wheel to run freely under all conditions of tolerance variation.

Still another feature derives from the fact that in use the weighted line is most likely to jump out of the pulley wheel groove and to snarl or to become wedged or otherwise to tangle where the line passes over the top of the pulley wheel. In order to keep the weighted line in the pulley groove in this vulnerable location and to prevent the line from rebounding out of the groove or to one side thereof when the weighted line or the lure attached to the fishing line is dragged across a rough bottom surface or through weeds, the housing is provided at the top of the slot in which the pulley wheel is mounted with a depending member of gear tooth shape in transverse section that projects into the pulley wheel groove. The member referred to complements the cross sectional configuration of the groove and overlays the weighted line where it overrides the pulley wheel. Furthermore, it is spaced sufficiently from the weighted line so as not to interfere when the latter is running on the bottom of the groove; but is spaced sufficiently from the line when the latter is at the bottom of the groove to permit free running movement thereof in use. Additionally, the depending member is spaced sufficiently from the sides of the pulley groove so as not to interfere with free rotation of the pulley wheel but it is spaced from the sides of the groove by a dimension less than the diameter of the weighted line so as to prevent the line from entering and jamming between the member and the sides of the pulley wheel groove even when the line is snapping back and forth with considerable force as it does when the weight, and perhaps the lure as well, are dragged along the bottom or through a weed bed.

Still another feature of the invention is the provision of inlet and outlet openings in the housing that are strategically shaped and positioned with respect to the pulley wheel groove to permit the line to be threaded readily through the pulley assembly with a minimum of interference either during the threading operation or during the smooth running action of the pulley wheel in use.

DESCRIPTION OF THE DRAWINGS

In the drawing forming a part of this specification and wherein like numerals are employed to describe like parts throughout the same, FIG. 1 is a front elevational view of a pulley assembly embodying the invention;

FIG. 2 is a side elevational view looking in the direction of the arrows 2—2 in FIG. 1;

FIG. 3 is an enlarged view similar to FIG. 1 but showing parts broken away for clearness of illustration;

FIG. 4 is a vertical sectional view taken on the line 4—4 of FIG. 3; and

FIG. 5 is a fragmentary radial sectional view taken on the line 5—5 of FIG. 3.

DESCRIPTION OF THE PREFERRED EMBODIMENT

In the drawing wherein for the purpose of illustration is shown a preferred embodiment of the invention, the numeral 10 designates the housing section of the pulley assembly, the numeral 12 designates the pulley wheel that is mounted for free running rotation in the housing section, and the numeral 14 designates a swivel mounting member carried by and extending upwardly from the housing section 10. In practice, the pulley assembly normally is oriented and mounted as shown in FIG. 1 with the swivel mounting member 14 extending upwardly alongside the free end of a downrigger arm 16 for free horizontal swinging movement about a pintle 18. As shown in FIG. 1, the pintle 18 has a head 20 that abuts the side of the member 14 remote from the arm 16, and a cylindrical shank portion 22 adjacent to the head extends through an opening 24 in the swivel member 14 and supports the latter for free swinging movement. A threaded terminal portion 26 of the pintle 18 extends into and is retained by an internally threaded socket 28 in the arm 16 to hold the pulley assembly swingably mounted on the arm.

In practice, the swivel mounting 16 is part of a supporting structure (not shown) that surmounts and is attached to the stern of a boat with the rotational axis of the pulley wheel 12 disposed above and substantially parallel to the stern. A weighted line 34 extends a reel (not shown) disposed forwardly or to the left of the pulley wheel assembly, as shown in FIG. 1, through an inlet 36 (FIG. 3), over the pulley wheel 12, and thence through an outlet 38 from which the line extends over the rear of the boat into the water.

In order that they may be made inexpensively, the housing section 10, pulley wheel 12, and mounting member 14 preferably are injection molded from a suitable plastic resin material. For the purpose of this description, it is assumed that the reel for the weighted line is mounted in any suitable or conventional manner ahead of or to the left of the pulley wheel assembly as the latter is shown in the drawing, and that the weighted line 34 extends rearwardly over and past the stern of the boat through the outlet 38. In use, as the weighted line 34 is payed out, it traverses and bears downwardly against the top of the pulley wheel 12 and causes the latter to rotate in a clockwise direction. Conversely, when the weighted line is reeled in, it moves in the opposite direction across the pulley wheel 12 causing the latter to rotate in a counterclockwise direction.

For ease of assembly, the housing section 10 preferably is formed in separate front and rear parts 10A and 10B (FIG. 4) that are detachably fastened together by screws 40, 42, 44, and 46 as perhaps best shown in FIGS. 1 and 3. In this connection, it will be appreciated that there are nuts (not shown) and, if desired, (not shown) washers as well, threaded on the ends of the screws 40-46. Ideally, both the heads of the screws 40-46 and the nuts referred to above are recessed into the housing sections 10A and 10B, respectively, so that no parts of the fastening means project beyond the smooth outer surface of the housing. The confronting inner surfaces of the housing sections 10A and 10B are formed with opposed recesses 48 and 50 that collectively define a slot 68 that opens downwardly through the bottom of the housing 10. The slot 68 is sufficiently large to accommodate substantially the entire upper half of the pulley wheel 12, as shown in the drawing. Horizontally aligned sockets 52 and 54 provided in the inner surfaces of the housing sections 10A and 10B receive the terminal end portions of an axle pin 56; and the pulley wheel 12 is mounted in the slot formed by the recesses 48 and 50 for rotation on the axle pin 56. In this connection, it will be observed that the housing sections 10A and 10B are formed with spherical protrusions 58 and 60 on the outer sides thereof to increase the thickness of the housing sections where the sockets 52 and 54 are formed and the pulley wheel 12 is provided with a centrally disposed bushing 62 which is journaled on the pin 56 as described above. The portion of the axle pin 56 extending between the housing sections 10A and 10B extends through the bushing 62, as perhaps best shown in FIG. 4, and journals the pulley wheel for free rotation on the pin. The front and rear hub surfaces 64 and 66 at opposite sides of the pulley wheel 12 preferably bear lightly on the inner surfaces of the housing parts 10A and 10B and the bearing surfaces may be and preferably are covered with a suitable light lubricant to assure relatively free rotation of the pulley wheel 12 while at the same time keeping the latter centered in the slot 68.

As suggested, the inlet opening 36 in the side 70 of the housing section 10 extends generally tangentially with respect to the pulley wheel 12. More particularly, the bottom 72 of the inlet opening 36 is disposed slightly below the bottom 74 of the pulley wheel groove so that when the weighted line 34 is inserted into the slot 68 through the inlet 36, it impinges against the bottom 74 of the pulley wheel groove and cause the pulley wheel to rotate in a clockwise direction to carry the line over the top of the pulley and into the outlet 38. In this connection, it should be noted that the weighted line 34 may be and frequently is a braided metal wire so that it is or may be curled slightly when it comes off the reel. This circumstance sometimes makes it difficult to thread the line through the pulley assembly and the disposition of the inlet opening 36 with reference to the pulley wheel groove, therefore, is significant in passing the line easily through the pulley assembly. In this connection, it also is of some signifance that the top surface 76 of the outlet 38 extends generally tangentially although spaced slightly radially outwardly from the rim of the pulley wheel 12; and the inner side of the outlet 38 opens laterally into the slot 68. The outwardly flared configuration of the outlet opening 38 and its relationship to the pulley wheel slot 68 is effective in guiding the weighted line 34 out of the housing, in compensating for any curl or twist in the line that might otherwise interfere and make it more difficult to thread the line through the housing section 10, and in preventing chafing of the line in use. In this connection, it will be observed also that, at its outer end, the top surface 76 is arcuately curved away from the outlet slot 38 so as to present a convex surface to the line 34 as it leaves the outlet to prevent wear or chafing of the line in the event the latter flips back and forth under the conditions and circumstances described in the "Background of the Invention" section of the specification. This flipping or bouncing of the weighed line 34 is a problem when trolling with downriggers as it sometimes causes the line to jam between the pulley and the pulley housing. In order to prevent or at least inhibit jamming of the weighed line, the outer end of the surface 76 is located below the bottom of the pulley groove at the top of the pulley as shown in FIG. 3 and above a horizontal line through the rotational axis of the pulley. Also, as clearly shown in FIG. 3, the outer end of the surface 76 is disposed between 10° and 20° above a horizontal line through the pin 56 and preferably approximately 15 degrees thereabove in order further to inhibit the weighted line from jumping radially outwardly in the pulley wheel grove particularly at the top of the pulley in such a way that it tends to jam between the sides of the pulley groove and the confronting sides of the segmental member 86. In practice, the 15° vertical spacing between the outer end of the surface 76 and the rotational axis of the pulley wheel has been found to be the optimum angular relation for preventing jamming.

It is a further feature of the present invention that the peripheries of the recesses 48 and 50 are curved so as to conform closely to the contour of the pulley wheel 12 and to define shoulders 78 and 80 that overlay the peripheral rim surfaces 82 and 84 formed on the pulley wheel 12 at opposite sides of the pulley wheel groove. The spacing between the shoulders 78 and 80 and the rim surfaces 82 and 84 is sufficient to assure free running movement of the pulley wheel but less than the diameter of the weighted line 34. As a consequence, the weighted line 34 is not able to penetrate either of the spaces between the shoulders 78 and 80 and the rim surfaces 82 and 84 even though the line is jerking and bouncing or thrashing from side to side in the slot 68 as the result of the weight at the end of the line 34 being dragged along the bottom or through weeds. The close fitting relationship between the shoulders 78 and 80 and the rim surfaces 82 and 84 preferably extends for the full length of the shoulders.

Still another feature of the invention is the provision of a depending segmental member 86 on the housing at the top of the slot 68. As perhaps best shown in FIG. 4, the segmental member 86 has downwardly tapered or convergent, substantially flat sides 88 and 90 that are spaced uniformly from the confronting flat opposite sides of the pulley wheel groove by a distance less than the diameter of the weighted line 34. Similarly, the bottom surface 92 of the segmental member 86 is spaced from the bottom of the pulley groove by a distance greater than the diameter of the weighted line 34. Thus, the weighted line 34 is free to run without hinderance from the segmental member 86 so long as it is in the bottom of the pulley wheel groove 68 but it is prevented by the closely spaced relationship between the sides of the segmental member and the sides of the pulley groove from penetrating either of the spaces between the sides of the segmental member and the sides of the pulley wheel groove and jamming so tightly that the pulley assembly must be disassembled in order to release the line.

Although the mounting member 14 is here shown separate from the housing section 10, it can if desired, be formed as part of the housing and that construction is contemplated insofar as this description of the invention and the claims are concerned. In addition to the foregoing, the ends 94 and 96 of the segmental member 86 are tapered downwardly and inwardly at a relatively flat angle so that they define inwardly tapered ways in cooperation with the pulley wheel groove. This is particularly significant in the case of the end 94 that faces the inlet 36; and it is desirable that the end 94 be tapered at such an angle that it deflects the end of the weighted line 34 into the space between the segmental member and the bottom of the pulley groove. For the same reason, it is desirable that the end 96 of the segmental member 86 facing the outlet 38 be sloped at such an angle that it tends to deflect the weighted line into the outlet as the line emerges from the relatively confined space between the segmental member and the bottom of the pulley wheel groove.

In connection with the foregoing, it will be readily appreciated that there is less tendency for the weighted line to curl or snarl after it leaves the pulley wheel. Nevertheless, there is some tendency for the weighted line to tangle at this point after it has remained tightly wound for some time on the reel prior to being threaded into the pulley assembly. The tendency is for the weighted line to try to penetrate one or the other of the spaces between the sides of the pulley wheel groove and the segmental member 86 since the pulley assembly swings on the pintle 18 as the boat rocks from side to side. In use, the weighted line 34 is under tension at all times; and, as the boat rolls, the line tends to move laterally onto a side surface of the pulley wheel groove. If the boat is rolling, the weighted line may strike the side of the pulley wheel groove with considerable force which of course results in an increased tendency for the line to wedge between the engaged side of the groove and the confronting surface of the segmental member 86. Further in this connection, the tendency of the weighted line to wedge between the side of the pulley wheel and the segmental member 86 under the circumstances recited above is aggravated by the leverage factor which results from the fact that the line 34 tends to tilt or cock the pulley wheel on the axle pin 56. Nevertheless, it has been found that the unique relationship between the segmental member 86 and the pulley wheel groove is particularly effective in preventing the weighted line from jamming under the conditions last recited above.

I claim:

1. A pulley assembly for the weighted line of a downrigger fishing apparatus, said assembly comprising
    a housing provided at the top thereof with a longitudinal swivel mounting and having a downwardly opening slot therein;
    and a rotatable pulley wheel having a peripheral groove provided with annular edge surfaces at opposite sides of said groove,
    said pulley wheel being carried by said housing with the upper portion thereof in said slot and the lower portion thereof extending exteriorly of said housing through the slot opening,
    said housing enclosing said upper portion of said pulley wheel and having curved shoulders overlaying the edge surfaces of said upper portion and spaced therefrom a distance less than the diameter of said weighted line whereby to prevent the latter from lodging between and wedging in the space between said edge surfaces and said shoulders,
    said housing further having a line inlet and a line outlet at opposite sides thereof,
    the enclosing portion of said housing being provided with a depending segmental member projecting into said groove, said groove having annular, substantially flat, radially inwardly convergent sides and said segmental member being generally complementary in cross section to the cross sectional shape of said groove with the bottom of said segmental member spaced from the bottom of said groove a distance greater than the diameter of said weighted line and the sides of said segmental member spaced substantially uniformly from the sides of said groove a distance less than the diameter of said weighted line, whereby said weighted line can run freely in the groove but the portion of said line at the top of said pulley wheel is guided in its running movement by said segmental member and whereby the latter and its closely spaced relationship with the sides of the pulley groove tends to prevent the line from jumping out of the groove and wedging in use between a side of the segmental member and the confronting side of the pulley wheel.

2. A pulley assembly as defined by claim 1 wherein said end of said segmental member facing said inlet is beveled to deflect a line inserted into said pulley groove through said inlet into the portion of said groove below said segmental member.

3. A pulley assembly as defined by claim 1
wherein one end of said segmental member is disposed between said inlet and a vertical plane through the rotational axis of the pulley wheel in confronting relation with respect to said inlet and is inclined downwardly and in the direction of said plane.

4. A pulley assembly as defined by claim 1
wherein the ends of said segmental member are tapered in the direction of said pulley wheel.

5. A pulley assembly as defined by claim 1
wherein said outlet opens laterally into said slot, and
wherein the top surface of said outlet extends outwardly and downwardly away from said slot from a point above the bottom of said pulley groove at the top of said pulley.

6. A pulley assembly as defined by claim 1
wherein said housing is divided into separate front and rear parts having confronting recesses defining said slot.

7. A pulley assembly as defined by claim 1
wherein said housing is divided into separate front and rear parts having confronting recesses defining said slots, and
wherein said recesses have peripheral arcuately curved surfaces facing and disposed concentrically with respect to the rotational axis of said pulley wheel and defining said shoulders.

8. A pulley assembly as defined by claim 1
wherein said housing is formed with front and rear housing members and a hanger member and includes means detachably interconnecting said housing members and said hanger member, said hanger member extending above said front and rear housing members and including
a swivel portion provided with a through hole extending in generally tangential relation with respect to but spaced above said pulley groove and substantially at right angles to the rotational axis of said pulley wheel.

9. A pulley wheel as defined by claim 1
wherein said housing has separate detachably interconnected front and rear housing members and a hanger member, said hanger member being disposed between said housing member above said slot, said hanger member carrying said segmental member and positioning the same in said pulley wheel groove.

10. A pulley assembly as defined by claim 1
wherein said housing has separate detachably interconnected front and rear housing members and a separate hanger member detachably fastened to said housing members,
said hanger member carrying said segmental member,
said hanger member normally positioning said segmental member in said pulley groove and operable when detached from said housing members to withdraw said segmental member from said pulley groove.

11. A pulley assembly as defined by claim 1
wherein both said inlet and said outlet opens into said lot adjacent the top of said pulley wheel,
said inlet being further disposed with the bottom surface thereof above the rotational axis of said pulley wheel and below the bottom of the pulley wheel groove at the top of said pulley wheel so that said pulley wheel deflects a weighted line inserted into said groove through said inlet upwardly over the wheel and thence exteriorly of the housing through said outlet.

* * * * *

UNITED STATES PATENT AND TRADEMARK OFFICE
CERTIFICATE OF CORRECTION

PATENT NO. : 4,644,678
DATED : February 24, 1987
INVENTOR(S) : Alex Seres

It is certified that error appears in the above-identified patent and that said Letters Patent is hereby corrected as shown below:

| | | |
|---|---|---|
| Column 4 line 28 | "signifance" should be --significance--. | |
| Column 4 line 60 | "grove" should be --groove--." | |
| Column 6, line 23 | "comprising" should be --comprising:--.* | |
| Column 6, line 26 | "therein:" should be --therein,--. | |
| Column 6, line 42 | "thereof," should be --thereof, and--. | |

UNITED STATES PATENT AND TRADEMARK OFFICE
CERTIFICATE OF CORRECTION

PATENT NO. : 4,644,678

DATED : February 24, 1987

INVENTOR(S) : Alex Seres

It is certified that error appears in the above-identified patent and that said Letters Patent is hereby corrected as shown below:

Column 8, line 19      "member," should be --member, and--.

Column 8, line 27      "lot" should be --slot--.

Column 8, line 27      "wheel," shuld be --wheel, and--.

Signed and Sealed this

Twenty-seventh Day of October, 1987

Attest:

DONALD J. QUIGG

*Attesting Officer*      *Commissioner of Patents and Trademarks*